United States Patent

Hong

(10) Patent No.: US 8,019,378 B2
(45) Date of Patent: Sep. 13, 2011

(54) APPARATUS AND METHOD FOR PREVENTING POWER CONSUMPTION IN MULTI-MODE PORTABLE TERMINAL

(75) Inventor: Sung-Min Hong, Seoul (KR)

(73) Assignee: Samsung Electronics Co., Ltd (KR)

(*) Notice: Subject to any disclaimer, the term of this patent is extended or adjusted under 35 U.S.C. 154(b) by 610 days.

(21) Appl. No.: 11/852,058

(22) Filed: Sep. 7, 2007

(65) Prior Publication Data

US 2008/0064435 A1    Mar. 13, 2008

(30) Foreign Application Priority Data

Sep. 7, 2006 (KR) .................. 10-2006-0086096

(51) Int. Cl.
*H04M 1/00* (2006.01)
(52) U.S. Cl. .................................... 455/552.1
(58) Field of Classification Search ........... 455/552.1, 455/550.1, 524, 500, 574, 13.4, 522, 127.1, 455/127.4, 127.5
See application file for complete search history.

(56) References Cited

U.S. PATENT DOCUMENTS

| | | | |
|---|---|---|---|
| 5,828,855 A * | 10/1998 | Walker | 710/305 |
| 2002/0147008 A1 | 10/2002 | Kallio | |
| 2003/0174681 A1 | 9/2003 | Gilberton et al. | |
| 2005/0025181 A1 | 2/2005 | Nazari | |
| 2007/0121536 A1 | 5/2007 | Aihara | |

FOREIGN PATENT DOCUMENTS

| | | |
|---|---|---|
| CN | 1643805 | 7/2005 |
| EP | 1 496 719 | 1/2005 |
| JP | 2004023768 | 1/2004 |
| KR | 1020040051909 | 6/2004 |
| KR | 1020050008746 | 1/2005 |
| WO | WO 01/22662 | 3/2001 |

OTHER PUBLICATIONS

Universal Mobile Telecommunications System (UMTS); 3GPP System to Wireles Local Area Network (WLAN) Interworking; System Description (3GPP TS 23.234 6.7.0 Release 6), Dec. 2005.

* cited by examiner

*Primary Examiner* — Eugene Yun
(74) *Attorney, Agent, or Firm* — The Farrel Law Firm, P.C.

(57) ABSTRACT

An apparatus and a method for preventing power consumption in a multi-mode portable terminal are provided. The apparatus includes a first communicator communicating with a mobile communication network; a second communicator communicating with a heterogeneous network; and a controller controlling the second communicator to scan an Access Point (AP) so as to perform a service connection to the heterogeneous network if a service connection to the mobile communication network is performed through the first communicator.

8 Claims, 4 Drawing Sheets

APPARATUS AND METHOD FOR PREVENTING POWER CONSUMPTION IN MULTI-MODE PORTABLE TERMINAL

PRIORITY

This application claims priority under 35 U.S.C. §119(a) to a Korean Patent Application filed in the Korean Intellectual Property Office on Sep. 7, 2006 and assigned Serial No. 2006-86096, the contents of which are incorporated herein by reference.

BACKGROUND OF THE INVENTION

1. Field of the Invention

The present invention relates generally to a portable terminal, and in particular, to an apparatus and a method for preventing power consumption in a portable terminal supporting access to at least two different networks.

2. Description of the Related Art

Unlicensed Mobile Access (UMA) technology refers to next generation integrated wired/wireless technology by which a Global System for Mobile Communication/General Packet Radio Service (GSM/GPRS)-based mobile communication network is connected to a wireless Local Area Network (LAN) using an unlicensed spectrum like Bluetooth® or the IEEE 802.11 standard. A UMA terminal adopting the UMA technology can freely perform voice and data communications by wire and wirelessly.

FIG. 1 is a block diagram of a conventional network supporting UMA technology.

In FIG. 1, a UMA Network (UMAN) 120 includes an Access Point (AP) 107 and a UMAN Controller (UNC) 109. The AP 107 operates as a Base Transceiver Station (BTS) 103 of a cellular network 110 to provide a radio link of a UMA terminal 101. The UNC 109 operates as a core network of a GSM/Enhanced Data Rates for Global Evolution (EDGE) Radio Access Network (GERAN) Base Station Subsystem (BSS) of the cellular network 110. Here, the BSS includes the BTS 103 and a Base Station Controller (BSC) 105. The UNC 109 includes a Security Gateway (SGW) for secure communications between the UMA terminal 101 and the UNC 109. The UMA terminal 101 is a dual-mode terminal which supports a multimedia network between a GSM and a wireless LAN. The core of a core mobile network 130 is a Mobile Switching Center (MSC). The MSC is similar to a switchboard of a Public Switched Telephone Network (PSTN) and takes charge of mobility management, position registration and/or management, authentication, Handover, Rove-In/Out, etc.

Essentially, the UMA terminal 101 is designed to support Rove-In/Out and Handover.

Rove-In/Out is technology by which a UMA terminal accesses a UMAN to use GSM voice and GPRS data services through the UMAN within a wireless LAN but accesses a cellular network to use the cellular network beyond the wireless LAN.

Handover refers to technology by which a user of a UMA terminal can continuously use a GSM voice call through a UMAN without a disconnection of the GSM voice call even when the user uses the GSM voice call within a cellular network and then goes into a wireless LAN.

Since a UMA terminal supports Rove-In/Out and Handover as described above, a user of the UMA terminal desires to use all GSM services through a UMAN within a wireless LAN. Thus, the UMA terminal, which is being provided with services through a GSM network, periodically scans an AP to check whether the UMA terminal is positioned within the wireless LAN. In other words, if the UMA terminal is positioned within the wireless LAN, the UMA terminal periodically scans the AP to use GSM services.

The method described above (i.e., the periodical scan of the AP) can contribute to improving efficiencies of Rove-In/Out and Handover. However, the frequent scan of the AP causes the portable terminal to consume large amounts of power. As a result, the lifespan of a battery used by portable terminal is reduced.

Accordingly, there is needed an apparatus and a method for preventing power consumption caused by a periodical scan of an AP to prolong the lifespan of a battery in multi-mode portable terminal.

SUMMARY OF THE INVENTION

An aspect of the present invention is to substantially solve at least the above problems and/or disadvantages and to provide at least the advantages below. Accordingly, one aspect of the present invention is to provide an apparatus and a method for scanning an Access Point (AP) using a multi-mode portable terminal.

Another aspect of the present invention is to provide an apparatus and a method for performing a service connection and then scanning an AP for accessing a heterogeneous network to prevent power consumption in a multi-mode portable terminal.

A further aspect of the present invention is to provide an apparatus and a method for stopping an access to a heterogeneous network and then performing a connection to a mobile communication network to prevent power consumption in a multi-mode portable terminal.

According to one aspect of the present invention, there is provided an apparatus for preventing power consumption in a multi-mode portable terminal supporting accesses to at least two different networks. The apparatus includes a first communicator communicating with a mobile communication network; a second communicator communicating with a heterogeneous network; and a controller controlling the second communicator to scan an AP so as to perform a service connection to the heterogeneous network if a service connection to the mobile communication network is performed through the first communicator.

According to another aspect of the present invention, there is provided a method of preventing power consumption in a multi-mode portable terminal supporting accesses to at least two different networks. The method includes checking whether a service connection to a heterogeneous network has been performed; if the service connection to the heterogeneous network has not been performed, scanning an AP; and if the AP is sensed through the scan of the AP, performing a connection to the heterogeneous network through the AP.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides a method for preventing consumption of a battery in a multi-mode portable terminal supporting access to at least two different networks, i.e., a mobile communication network and a heterogeneous network.

The heterogeneous network may be any network except for a mobile communication network. An Unlicensed Mobile Access Network (UMAN) will be described as an example of the heterogeneous network.

A Global System for Mobile Communications/General Packet Radio Service (GSM/GPRS) network that is an asynchronous mobile communication network will be described as an example of the mobile communication network. However, the present invention may be equally applied to all networks, which can be linked to a UMA, like asynchronous and synchronous mobile communication networks, e.g., Code Division Multiple Access (CDMA) networks, etc.

Figure 1:
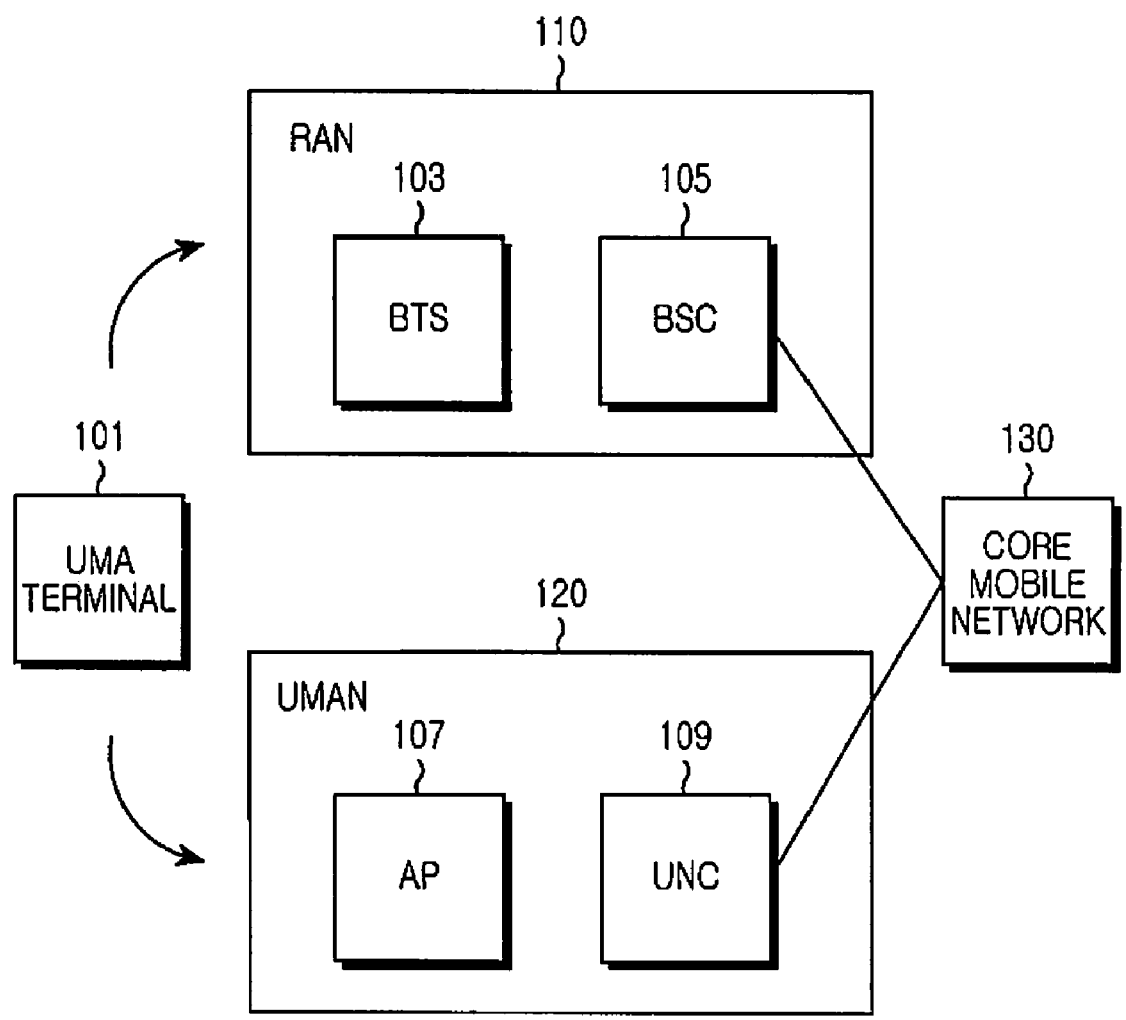
FIG. 1 is a block diagram of a conventional network supporting Unlicensed Mobile Access (UMA) technology.
Figure 2:
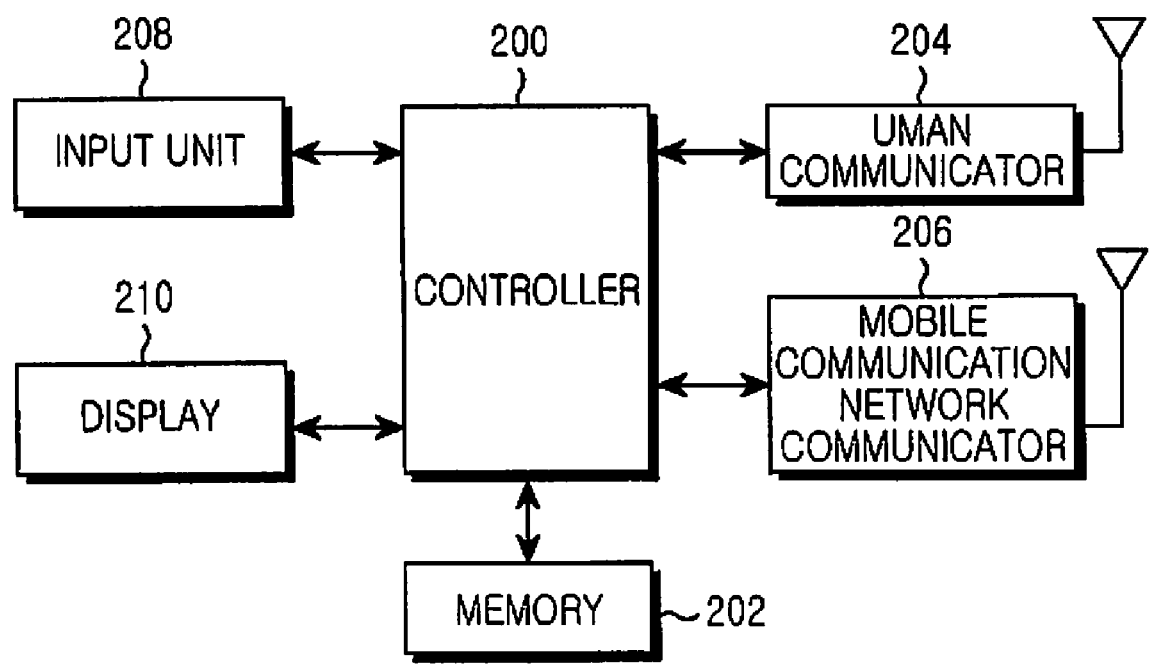
FIG. 2 is a block diagram of a multi-mode portable terminal according to the present invention.

FIG. 2 is a block diagram of a multi-mode portable terminal according to the present invention. In FIG. 2, the multi-mode portable terminal includes a controller 200, a memory 202, a UMAN communicator 204, a mobile communication network communicator 206, an input unit 208, and a display 210.

The controller 200 controls an overall operation of the multi-mode portable terminal. For example, the controller 200 performs processing and controlling for voice and data communications. According to the present invention, the controller 200 performs a service connection besides the normal function of performing the processing and controlling. Next, if the controller 200 checks that the multi-mode portable terminal is not connected to a UMAN, the controller 200 scans an Access Point (AP) at which the multi-mode portable terminal can be connected to the UMAN. If the controller 200 senses the AP through the scan of the AP, the controller 200 processes a connection to the UMAN through a UMA network Controller (UNC).

If the controller 200 does not sense the AP through the scan of the AP, the controller 200 performs a connection to a mobile communication network to maintain a service.

The memory 202 may be a program memory, a data memory, a nonvolatile memory, or the like. The memory 202 stores a program for controlling the overall operation of the multi-mode portable terminal, temporary data generated during the operation of the multi-mode portable terminal, system parameters, storage data (telephone numbers, messages, etc.), and a program for operating the controller 200.

The UMAN communicator 204 is a physical (PHY) interface module for accessing the UMAN. The mobile communication network communicator 206 is a PHY interface module for accessing a mobile communication access network. If the multi-mode portable terminal is positioned within a wireless Local Area Network (LAN), the multi-mode portable terminal accesses a core mobile network through the UMAN communicator 204. If the multi-mode portable terminal is positioned beyond the wireless LAN, the multi-mode portable terminal accesses the core mobile network through the mobile communication network communicator 206.

The input unit 208 includes a plurality of keys and provides key input data corresponding to a key pressed by a user to the controller 200. The display 210 displays state information (or indicators) generated during the operation of the multi-mode portable terminal, and letters, moving pictures, and still pictures, etc. input by the user. Here, the display 210 may be a Liquid Crystal Display (LCD). If the LCD includes a touch screen, the LCD may operate as an input device.

An apparatus for preventing power consumption through a search for an AP has been described. A method of searching for an AP to prevent power consumption using the apparatus will be described below.

Figure 3:
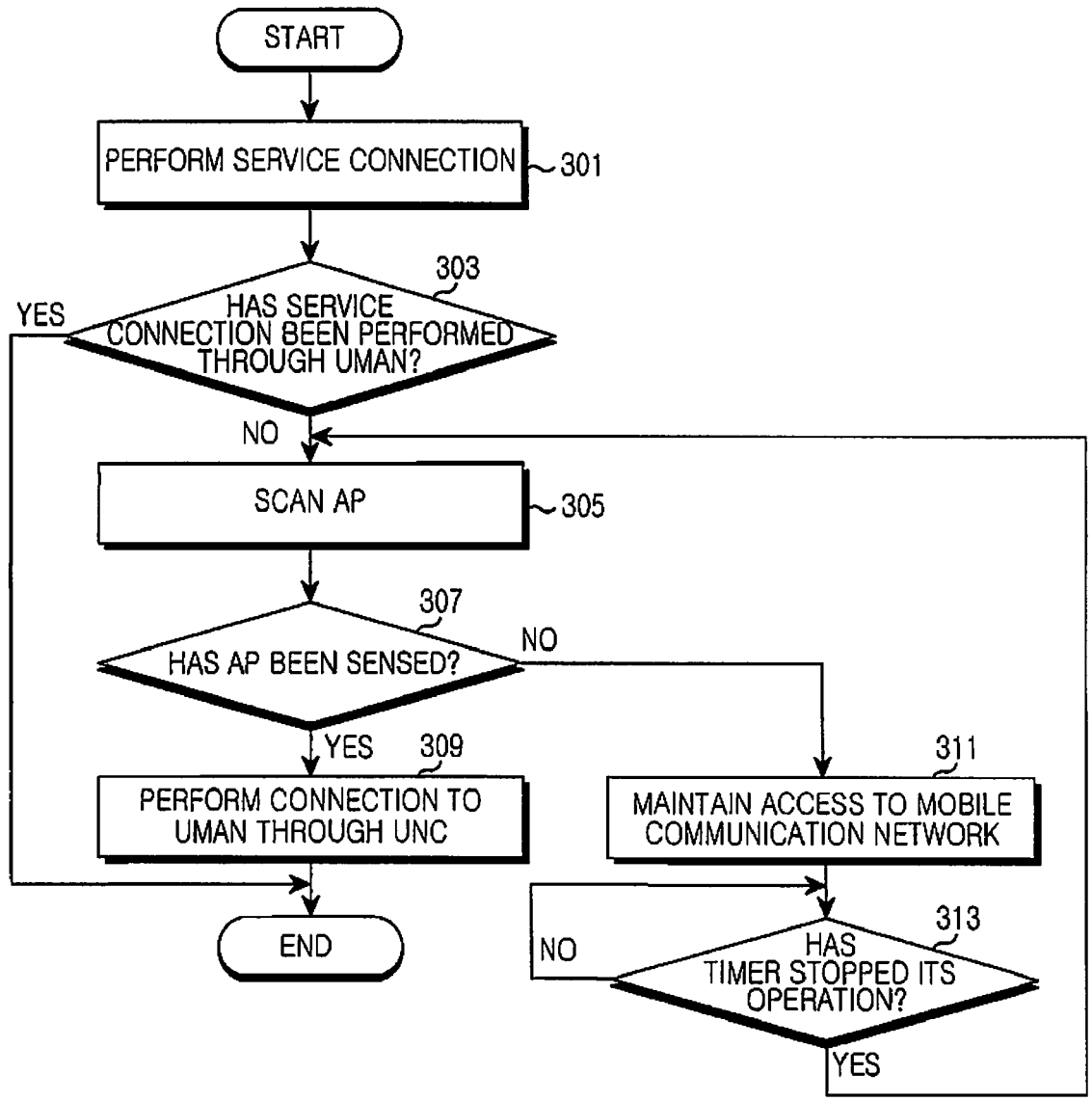
FIG. 3 is a flowchart of a process of scanning an Access Point (AP) to prevent power consumption in a multi-mode portable terminal according to the present invention.

FIG. 3 is a flowchart of a process of scanning an AP to prevent power consumption in a multi-mode portable terminal according to the present invention.

In FIG. 3, the controller 200 performs a service connection in step 301. Here, the service connection refers to a connection to voice and data services. If the service connection is not performed, it is supposed that the multi-mode portable terminal is connected to a mobile communication network.

In step 303, the controller 200 checks whether the service connection is performed through a UMAN. If the service connection is performed through the UMAN in step 300, the controller 200 ends the present algorithm. In other words, if the service connection is performed through the UMAN, the multi-mode portable terminal uses, a voice or data service through the UMAN to which the multi-mode portable terminal is being connected.

If the service connection is not performed through the UMAN in step 303, the controller 200 proceeds to step 305 to scan an AP for checking a wireless LAN area. The scan of the AP is a process of checking whether the wireless LAN area exists in order to try Rove-In and Handover.

In step 307, the controller 200 checks whether the AP has been successfully sensed. If the AP has not been successfully sensed in step 307, the controller 200 goes to step 311 to determine that the wireless LAN area does not exist and then accesses a mobile communication network through the mobile communication network communicator 206 so as to maintain a service.

In step 313, the controller 200 checks whether a timer has completed its operation when being connected to the mobile communication network in order to use the service through the UMAN. The completion of the operation of the timer can be checked using a method of operating the timer after an access to the mobile communication network and then checking whether the timer operates for a predetermined period of time.

If the timer has not completed its operation in step 313, the controller 200 re-performs step 313.

If the timer has completed its operation in step 313, the controller 200 repeats step 305.

If the AP has been successfully sensed in step 307, the controller 200 goes to step 309 to perform a connection to the UMAN through the UMAN communicator 204. In other words, an access to a UNC is performed through the searched AP to try Rove-In and Hand-In so as to use a GSM voice service or a GPRS data service through the UMAN.

The controller 200 then ends the process.

If the scan of the AP is performed during the service connection as described above, a power consumption problem occurring during the periodical scan of the AP can be solved.

Figure 4:
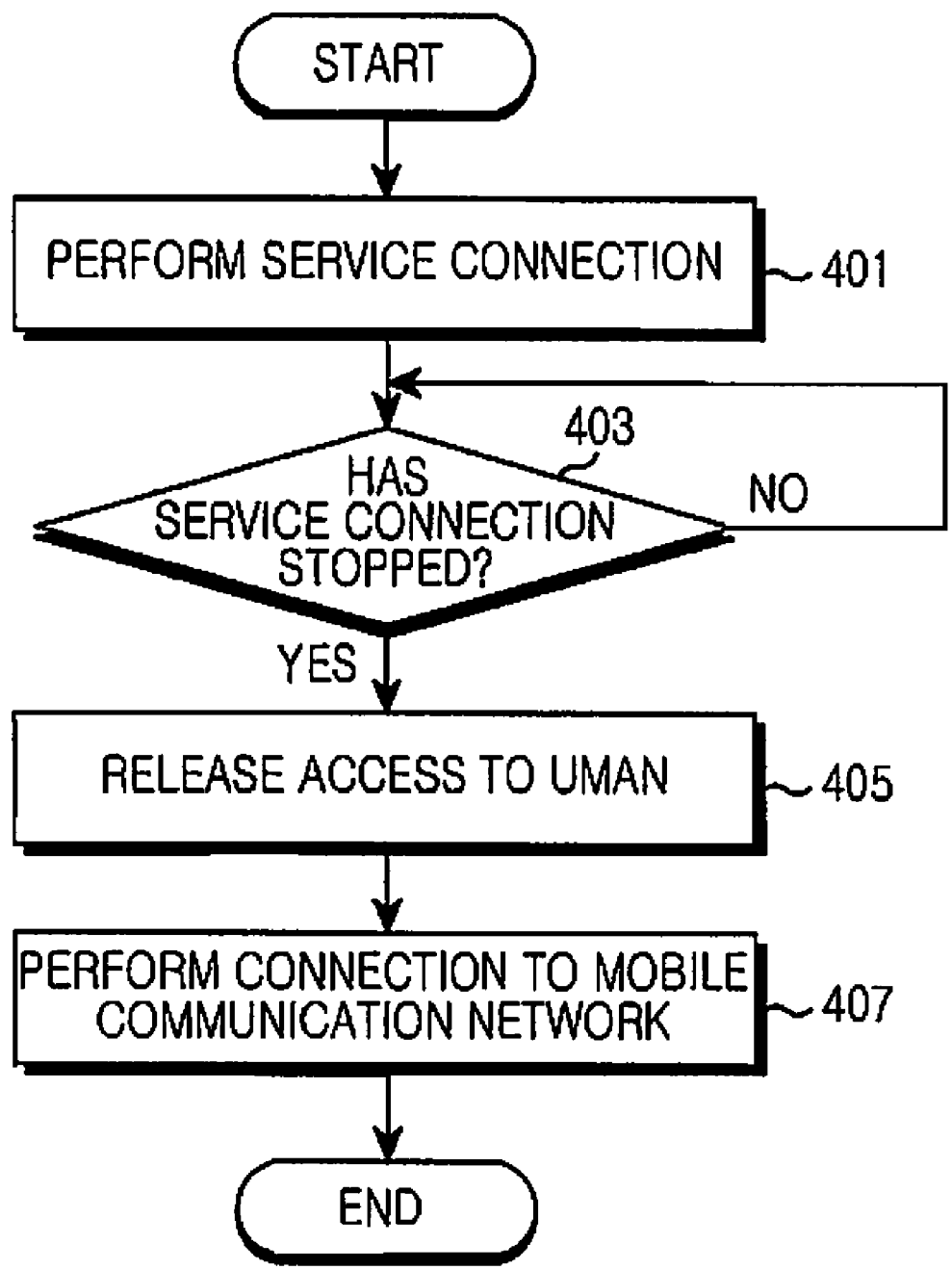
FIG. 4 is a flowchart of a process of preventing consumption of a battery after a call stops in a multi-mode portable terminal according to the present invention.

FIG. 4 is a flowchart of a process of preventing consumption of a battery after a call stops in a multi-mode portable terminal according to the present invention.

In FIG. 4, the controller 200 performs a service connection in step 401. Here, the service connection indicates a connection to a voice or data service through the UMAN communicator 204.

In step 403, the controller 200 checks whether the service connection has stopped. If the service connection has not stopped in step 403, the controller 200 re-performs step 403.

If the service connection has stopped in step 403, the controller 200 proceeds to step 405 to release a connection to the UMAN. In step 407, the controller 200 controls the mobile communication network communicator 206 to access a mobile communication network.

The controller 200 then ends the process.

According to the above-described method, a power consumption problem caused by an access to a UMAN can be solved through access to a mobile communication network after a service connection performed through the UMAN stops.

In accordance with the present invention as described above, access to a UMAN can be checked only if a voice or data service is performed. Thus, power consumption resulting from a periodical scan of an AP can be prevented.

Also, if a service connection has stopped, a connection to a mobile communication network can be performed to prevent power consumption in a portable terminal.

Alternate embodiments of the present invention can also comprise computer readable codes on a computer readable medium. The computer readable medium includes any data storage device that can store data that can be read by a computer system. Examples of a computer readable medium include magnetic storage media (such as ROM, floppy disks, and hard disks, among others), optical recording media (such as CD-ROMs or DVDs), and storage mechanisms such as carrier waves (such as transmission through the Internet). The computer readable medium can also be distributed over network coupled computer systems so that the computer readable code is stored and executed in a distributed fashion. Also, functional programs, codes, and code segments for accomplishing the present invention can be construed by programmers of ordinary skill in the art to which the present invention pertains.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An apparatus for preventing power consumption in a multi-mode portable terminal supporting access to at least two different networks, the apparatus comprising:
    a first communicator communicating with a mobile communication network;
    a second communicator communicating with a heterogeneous network; and
    a controller controlling the second communicator to scan an Access Point (AP) so as to perform a service connection to the heterogeneous network if a service connection to the mobile communication network is performed,
    wherein the controller releases a connection to the heterogeneous network when the service connection through the heterogeneous network has stopped,
    wherein, if the AP is not sensed, the controller controls the first communicator to maintain a service of the mobile communication network to which the multi-mode portable terminal is connected, and
    wherein, if a period of time elapses after the service of the mobile communication network is maintained, the controller controls the second communicator to scan the AP to perform a service connection to the heterogeneous network.

2. The apparatus of claim 1, wherein the heterogeneous network includes an Unlicensed Mobile Access Network (UMAN).

3. The apparatus of claim 1, wherein the service includes at least one of voice and data services.

4. A method of preventing power consumption in a multi-mode portable terminal supporting access to at least two different networks, the method comprising:
    checking whether a service connection to a heterogeneous network has been performed;
    if the service connection to the heterogeneous network has not been performed, scanning an Access Point (AP);
    if the AP is sensed through the scan of the AP, performing a connection to the heterogeneous network through the AP;
    if the service connection through the heterogeneous network has stopped, releasing a connection to the heterogeneous network;
    if the AP is not sensed, maintaining an access to a mobile communication network; and
    if a predetermined period of time elapses after the access to the mobile communication network is maintained, scanning the AP to perform the connection to the heterogeneous network.

5. The method of claim 4, wherein the heterogeneous network includes an Unlicensed Mobile Access Network (UMAN).

6. The method of claim 4, wherein the service includes at least one of voice and data services.

7. A multi-mode portable terminal supporting access to at least two different networks for preventing power consumption, the multi-mode portable terminal comprising:
    means for checking whether a service connection to a heterogeneous network has been performed;
    means for scanning an Access Point (AP) if the service connection to the heterogeneous network has not been performed;
    means for performing a connection to the heterogeneous network through the AP; and
    means for releasing a connection to the heterogeneous network when the service connection through the heterogeneous network has stopped,
    wherein, if the AP is not sensed, an access to a mobile communication network is maintained, and
    wherein, if a predetermined period of time elapses after the access to the mobile communication is maintained, the AP is scanned to perform the connection to the heterogeneous network.

8. A multi-mode portable terminal comprising:
    a first segment for checking whether a service connection to a heterogeneous network has been performed;
    a second segment for scanning an Access Point (AP) if the service connection to the heterogeneous network has not been performed;
    a third segment for performing a connection to the heterogeneous network through the AP; and
    a fourth segment for releasing a connection to the heterogeneous network if the service connection through the heterogeneous network has stopped,
    wherein if the AP is not sensed, access to a mobile communication network is maintained, and wherein, if a predetermined period of time elapses after is maintaining access to the mobile communication network, scanning the AP to perform the connection to the heterogeneous network, and wherein the multi-mode portable terminal limits power consumption by delaying commencement of a scan for the AP to perform a service connection to the heterogeneous network until a period of time elapses after access to the mobile communication network.

* * * * *